United States Patent
Rakshit et al.

(10) Patent No.: US 10,140,442 B1
(45) Date of Patent: Nov. 27, 2018

(54) IMPRESSION AUTHENTICATION

(71) Applicant: INTERNATIONAL BUSINESS MACHINES CORPORATION, Armonk, NY (US)

(72) Inventors: Sarbajit K. Rakshit, Kolkata (IN); Sathya Santhar, Chennai (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/600,181

(22) Filed: May 19, 2017

(51) Int. Cl.
| | |
|---|---|
| *G06F 3/00* | (2006.01) |
| *G06F 3/041* | (2006.01) |
| *G06F 3/042* | (2006.01) |
| *G06F 19/00* | (2018.01) |
| *G06Q 10/08* | (2012.01) |
| *H04L 9/00* | (2006.01) |
| *H04N 7/16* | (2011.01) |
| *G06F 21/32* | (2013.01) |
| *G06K 9/00* | (2006.01) |
| *G06K 9/62* | (2006.01) |

(52) U.S. Cl.
CPC ......... *G06F 21/32* (2013.01); *G06K 9/00087* (2013.01); *G06K 9/00912* (2013.01); *G06K 9/00926* (2013.01); *G06K 9/6255* (2013.01)

(58) Field of Classification Search
CPC .............. G06F 3/00; G06F 3/041; G06F 3/042
USPC .......................................... 340/5.83; 715/863
See application file for complete search history.

(56) References Cited

U.S. PATENT DOCUMENTS

| | | | | |
|---|---|---|---|---|
| 6,993,157 B1* | 1/2006 | Oue | ................... | B60R 25/2045 348/169 |
| 7,131,132 B1* | 10/2006 | Gehlot | ................... | G06F 21/32 725/10 |
| 7,971,156 B2* | 6/2011 | Albertson | ............... | G06F 21/35 715/863 |

(Continued)

FOREIGN PATENT DOCUMENTS

| | | |
|---|---|---|
| WO | 085434 | 6/2015 |
| WO | 2016010524 | 1/2016 |

OTHER PUBLICATIONS

Beumier, C. et al.; Automatic face authentication from 3D surface. Proceedings of the British Machine Vision Conference; Sep. 1998; 10 pages.

(Continued)

*Primary Examiner* — Nam V Nguyen
(74) *Attorney, Agent, or Firm* — Schmeiser, Olsen & Watts; Mark C. Vallone

(57) ABSTRACT

A method and system for improving authentication is provided. The method includes continuously receiving in real time from video retrieval devices, visual data associated with a surface of a structure associated with receiving authentication attributes for user access to hardware or software. User interactions with the surface of the structure are continuously tracked in real time via the visual data and it is determined that a first user interaction includes an authentication interaction for authorizing the user to access the hardware or software. In response, a visual image of the first user interaction is compared to a previous user authentication interaction with the surface of the structure and an action associated with the access to the hardware or software is executed.

19 Claims, 6 Drawing Sheets

(56) References Cited

U.S. PATENT DOCUMENTS

| | | | | |
|---|---|---|---|---|
| 8,199,019 B2* | 6/2012 | Kaczmarz | ............. | F25D 29/008 340/5.73 |
| 9,171,200 B2* | 10/2015 | Subramanian | .......... | G06F 3/011 |
| 9,251,407 B2* | 2/2016 | Kaehler | .................. | G06F 3/017 |
| 9,465,461 B2* | 10/2016 | Holz | .................. | H04N 5/23241 |
| 9,696,867 B2* | 7/2017 | Holz | ................... | G06F 3/04815 |
| 9,813,453 B2* | 11/2017 | Motoyama | .............. | H04L 63/20 |
| 2009/0103780 A1* | 4/2009 | Nishihara | ............... | G06F 3/017 382/103 |
| 2015/0186708 A1 | 7/2015 | Katz | | |
| 2016/0054804 A1* | 2/2016 | Gollakata | ............... | G06F 3/017 345/156 |

OTHER PUBLICATIONS

Sharma, Avinash et al.; Projected Texture for Hand Geometry based Authentication; IEEE Computer Society Conference on Computer Vision and Pattern Recognition Workshops; Jun. 23-28, 2008; 6 pages.

Voloshynovskiy, Sviatoslav et al.; Random projections based item authentication; Proceedings of SPIE 7254, Media Forensics and Security; Feb. 4, 2009; 10 pages.

\* cited by examiner

IMPRESSION AUTHENTICATION

FIELD

The present invention relates generally to a method for authenticating a user and in particular to a method and associated system for improving finger impression authentication technology associated with enabling user based actions with respect to accessing hardware or software.

BACKGROUND

Accurately enabling user access typically includes an inaccurate process with little flexibility. Controlling device access permissions may include a complicated process that may be time consuming and require a large amount of resources. Accordingly, there exists a need in the art to overcome at least some of the deficiencies and limitations described herein above.

SUMMARY

A first aspect of the invention provides an authentication improvement method comprising: continuously receiving in real time, by a processor of a hardware device from a plurality of video retrieval devices, visual data associated with a surface of a structure associated with receiving authentication attributes for user access to hardware or software; continuously tracking in real time, by the processor via the visual data, user interactions with the surface of the structure; determining, by the processor, that a first user interaction of the user interactions comprises an authentication interaction for authorizing the user to access the hardware or software; comparing, by the processor in response to results of the determining, a visual image of the first user interaction with a previous user authentication interaction with the surface of the structure; and executing, by the processor based on results of the comparing, an action associated with the access to the hardware or software.

A second aspect of the invention provides a computer program product, comprising a computer readable hardware storage device storing a computer readable program code, the computer readable program code comprising an algorithm that when executed by a processor of a hardware device implements an authentication improvement method, the method comprising: continuously receiving in real time, by the processor from a plurality of video retrieval devices, visual data associated with a surface of a structure associated with receiving authentication attributes for user access to hardware or software; continuously tracking in real time, by the processor via the visual data, user interactions with the surface of the structure; determining, by the processor, that a first user interaction of the user interactions comprises an authentication interaction for authorizing the user to access the hardware or software; comparing, by the processor in response to results of the determining, a visual image of the first user interaction with a previous user authentication interaction with the surface of the structure; and executing, by the processor based on results of the comparing, an action associated with the access to the hardware or software.

A third aspect of the invention provides a hardware device comprising a processor coupled to a computer-readable memory unit, the memory unit comprising instructions that when executed by the computer processor implements an authentication improvement method comprising: continuously receiving in real time, by the processor from a plurality of video retrieval devices, visual data associated with a surface of a structure associated with receiving authentication attributes for user access to hardware or software; continuously tracking in real time, by the processor via the visual data, user interactions with the surface of the structure; determining, by the processor, that a first user interaction of the user interactions comprises an authentication interaction for authorizing the user to access the hardware or software; comparing, by the processor in response to results of the determining, a visual image of the first user interaction with a previous user authentication interaction with the surface of the structure; and executing, by the processor based on results of the comparing, an action associated with the access to the hardware or software.

The present invention advantageously provides a simple method and associated system capable of accurately enabling user access.

DETAILED DESCRIPTION

Figure 1:
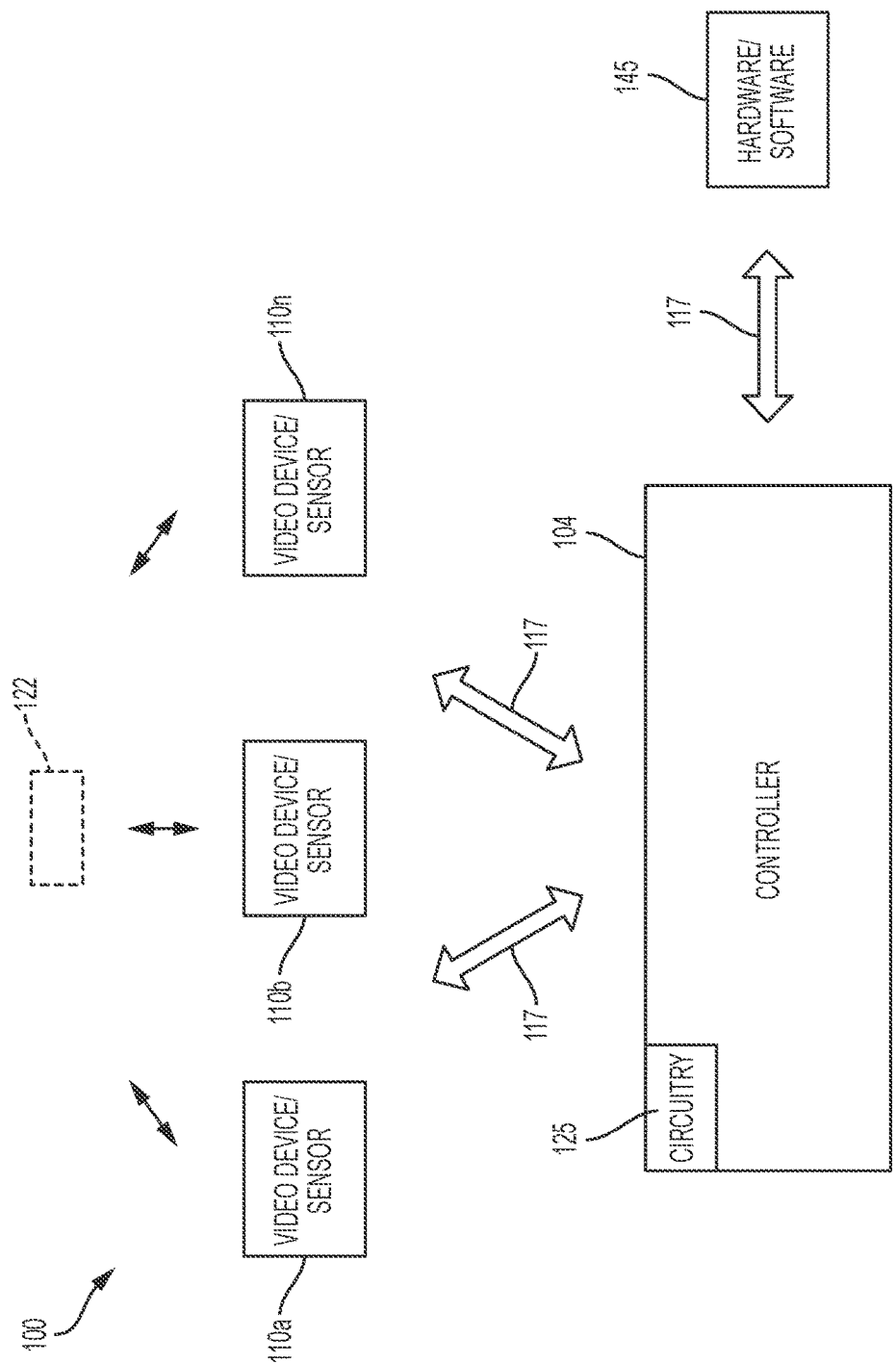
FIG. 1 illustrates a system for improving finger impression authentication technology associated with enabling user based actions with respect to accessing hardware or software, in accordance with embodiments of the present invention.

FIG. 1 illustrates a system 100 for improving finger impression authentication technology associated with enabling user based actions with respect to accessing hardware or software, in accordance with embodiments of the present invention. System 100 enables a process for analyzing finger impressions of a user on a surface of a non-display structure 122 for authenticating a user for access to hardware/software 145 (e.g., a computer, a secure Website, secure data storage, etc.). System 100 executes a process that includes scanning user's finger print from a projected surface and comparing the scanned finger print with previously captured finger print images for user authentication for access to hardware/software 145.

System 100 of FIG. 1 includes a controller 104 (i.e., specialized hardware device(s)), video (retrieval) devices/sensors 110a . . . 110n, and hardware/software system 145 interconnected through a network 117. Controller 104 includes specialized circuitry 125 that may include specialized software. Controller 104, video devices/sensors 110a . . . 110n, and hardware/software system 145 may be located within a specified geographical location/structure (e.g., a building, a room, etc.). Video devices/sensors 110a . . . 110n may include video retrieval devices and internal or integrated sensors. Video devices/sensors 110a . . . 110n may include any type of video retrieval devices including, inter alia, video cameras, infrared cameras, still cameras, etc. Video devices/sensors 110a . . . 110n may include any type of sensors including, inter alia, infrared sensors, optical sensors, motion sensors, etc. Controller 104, video devices/sensors 110a . . . 110n, and hardware/software system 145 may include specialized internal circuitry/logic. Controller 104, video devices/sensors 110a . . . 110n, and hardware/software system 145 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, controller 104, video devices/sensors 110a . . . 110n, and hardware/software system 145 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving finger impression authentication technology associated with enabling user based actions with respect to accessing hardware or software. Network 117 may include any type of network including, inter alia, a local area network, (LAN), a wide area network (WAN), the Internet, a wireless network, etc. Alternatively, network 117 may include application programming interfaces (API).

System 100 enables a process executed with respect to a surface area of non-display structure 122. System 100 may be enabled for use within, inter alia, a home network, a restaurant, a hotel, etc. thereby allowing a user to interact with various digital content projected on surface area of non-display structure 122. The following implementation example illustrates an authentication process implemented by system 100:

1. Multiple infrared cameras (e.g., video device/sensors 110a . . . 110n) installed within system 100 are enabled to periodically or continuously scan a projected surface of a non-display structure (e.g., non-display structure 122) to analyze all available finger impressions, stains, etc. located on the projected surface. A finger impression is defined herein as an impression left (on a surface) by friction ridges of a human finger, foot, etc. Finger impressions may be easily deposited on suitable surfaces (e.g., glass, metal, polished stone, etc.) via natural secretions of sweat from eccrine glands present in the aforementioned epidermal ridges.

2. The multiple infrared cameras are enabled to periodically or continuously track a user's interactions with the projected surface and determine if any tracked interaction is associated with a finger impression based authentication gesture. Therefore, immediately after a gesture has been executed, the multiple infrared cameras are configured to scan the projected surface. All currently captured finger impression images are compared previously captured images of the projected surface to identify a currently scanned finger impression.

3. Based on identified coordinates of a newly scanned finger impression and projected content, software installed within controller 104 validates if required objects or actions require finger impression authentication.

4. Alternatively, when any object on the projected surface requires authentication, an infrared camera will scan an area of the projected surface where a finger print would typically be sensed. In response, the controller will request that the user places a finger adjacent to the area so that the area is scanned again to identify a new finger print.

5. The controller 104 executes an associated action based on appropriate level of authentication and finger impression is identified base on a comparative analysis of the two images (i.e., captured before the finger impression gesture and after the finger impression gesture).

6. Based on an infrared image analysis process (i.e., if it is determined that the projected surface comprises multiple stains or old finger impressions) a user is notified to clean the projected surface.

Figure 2:
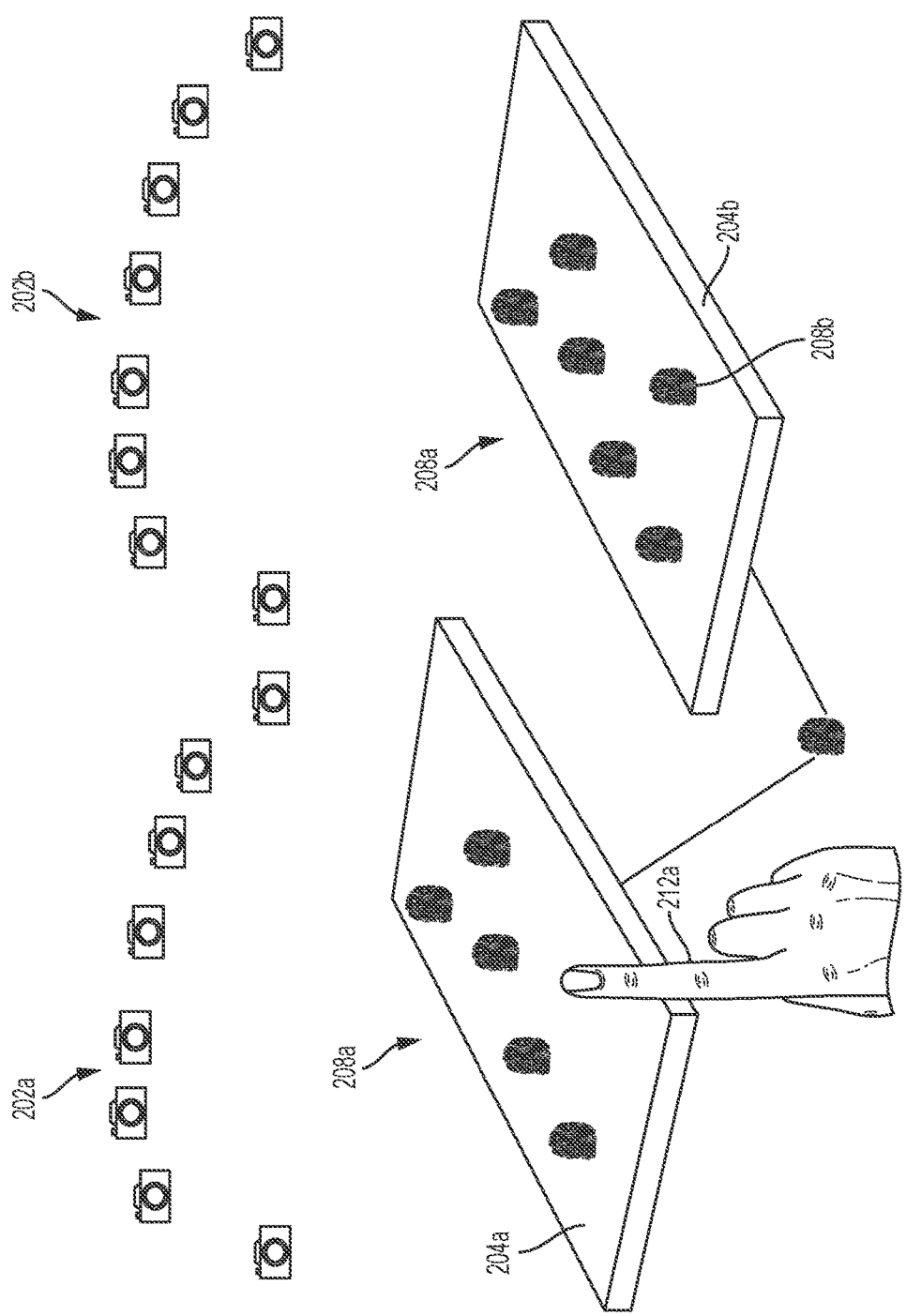
FIG. 2 illustrates an implementation example for retrieving finger impressions from a non-display surface of a structure in accordance with embodiments of the present invention.

FIG. 2 illustrates an implementation example for retrieving finger impressions from a non-display surface of a structure in accordance with embodiments of the present invention. The implementation example illustrated in FIG. 2 comprises a plurality of pico-projectors 202a and a plurality of infrared cameras 202b installed surrounding a non-display surface of a structure. The plurality of pico-projectors 202a are configured to project contents on non-display surface of a structure (e.g., a table, a wall, etc.). FIG. 2 illustrates a non-display surface of a structure 204a (i.e., before a finger impression gesture 212 has been executed) and a non-display surface of a structure 204b (i.e., after a finger impression gesture 212 has been executed). Non-display surface of structure 204a comprises finger impressions 208a before finger impression gesture 212 has been executed. Non-display surface of structure 204b comprises finger impressions 208a before finger impression gesture 212 has been executed as well as a finger impression 208b after finger impression gesture 212 has been executed. The plurality of infrared cameras 202b are enabled for tracking a user's interaction with respect to projected contents. Periodically, a controller scans (via the plurality of infrared cameras 202b) the projected surfaces and multiple camera feeds are combined to locate stains and available finger prints. All user interactions are tracked and if an interaction is determined to be related to a finger impression authentication gesture, then associated infrared cameras are activated to scan the projected surface. For example, all infrared images for each and every hand based action are captured and compared. In response, all captured images are used to identify a newly performed finger impression action. A location coordinate for the executed finger impression is calculated and accordingly projected content within the location coordinate is identified. In response, all newly retrieved finger impressions are analyzed and it is determined if the user has associated authorizations to execute an action with respect to selected digital objects. If the user has associated authorizations (i.e., with respect to a finger impression authentication on the non-display surface) to execute the action then action is executed and projected contents are modified. The plurality of infrared cameras 202b will additionally verify if the projected surface is clean or has empty spaces and accordingly the projected content position is modified or the user is instructed to clean the surface.

Figure 3:
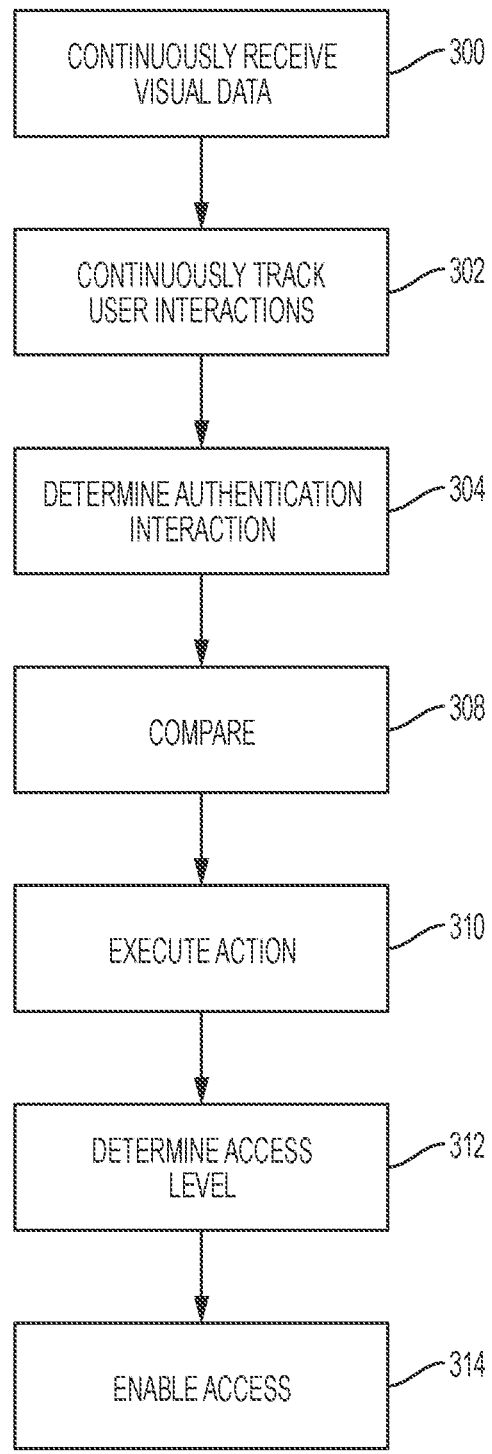
FIG. 3 illustrates an algorithm detailing a process flow enabled by the system of FIG. 1 for improving finger impression authentication technology associated with enabling user based actions with respect to accessing hardware or software, in accordance with embodiments of the present invention.

FIG. 3 illustrates an algorithm detailing a process flow enabled by system 100 of FIG. 1 for improving finger impression authentication technology associated with enabling user based actions with respect to accessing hardware or software, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by controller 104 and video device/sensor 110a . . . 110n of FIG. 1. In step 300, visual data is continuously received (in real time) from a plurality of video retrieval devices (e.g., video device/sensor 110a . . . 110n of FIG. 1). The visual data is associated with a surface of a structure (e.g., non-display structure 122 of FIG. 1) associated with receiving authentication attributes for user access to hardware or software. In step 302, user interactions with the surface of the structure are continuously tracking in real time. The user interactions may comprise finger impression authentication actions with respect to the surface of the structure. In step 304, it is determined that a first user interaction comprises an authentication interaction for authorizing the user to access the hardware or software. In step 308, a visual image of the first user interaction is compared with a previous user authentication interaction with the surface of the structure. The previous user authentication interaction may be associated with visual data associated with the previously retrieved user authentication interaction stored in a database. Alternatively, the previous user authentication interaction may be associated with an additional visual image retrieved from the surface of the structure. The additional visual image may be associated a previous user authentication interaction executed with respect to the surface of the structure. In step 310, an action is executed based on results of step 308. The action is associated with access the hardware or software. In step 312 (if results of step 308 indicate that the user is authorized to access the hardware or software) a specified level of access to the hardware or software is determined. In step 314, the user is authorized to access the hardware or software at the specified level of access. If results of step 308 indicate that said user is not authorized to access the hardware or software the user may be blocked from accessing the hardware or software.

Figure 4:
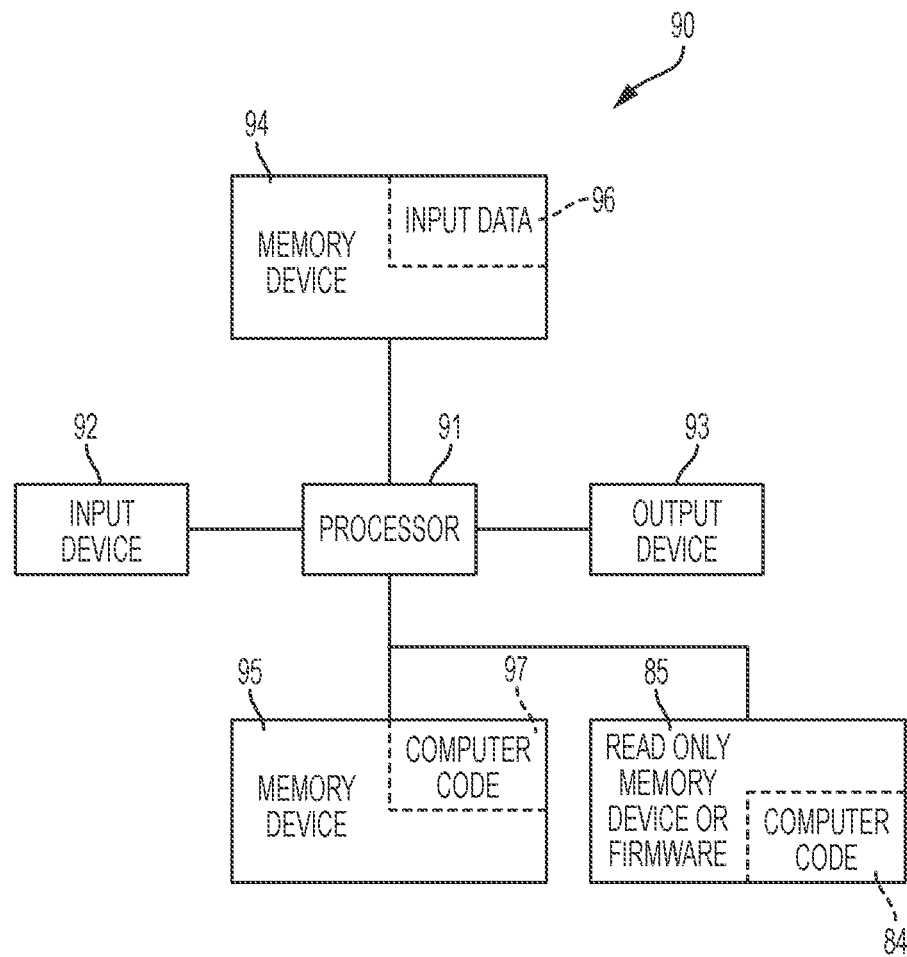
FIG. 4 illustrates a computer system used by the system of FIG. 1 for improving finger impression authentication technology associated with enabling user based actions with respect to accessing hardware or software, in accordance with embodiments of the present invention.

FIG. 4 illustrates a computer system 90 (e.g., controller 104 and/or video device/sensor 110a . . . 110n of FIG. 1) used by or comprised by the system of FIG. 1 for improving finger impression authentication technology associated with enabling user based actions with respect to accessing hardware or software, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for improving finger impression authentication technology associated with enabling user based actions with respect to accessing hardware or software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve finger impression authentication technology associated with enabling user based actions with respect to accessing hardware or software. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving finger impression authentication technology associated with enabling user based actions with respect to accessing hardware or software. In another embodiment, the invention provides a business method that performs the process steps of the invention on a subscription, advertising, and/or fee basis. That is, a service supplier, such as a Solution Integrator, could offer to enable a process for improving finger impression authentication technology associated with enabling user based actions with respect to accessing hardware or software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
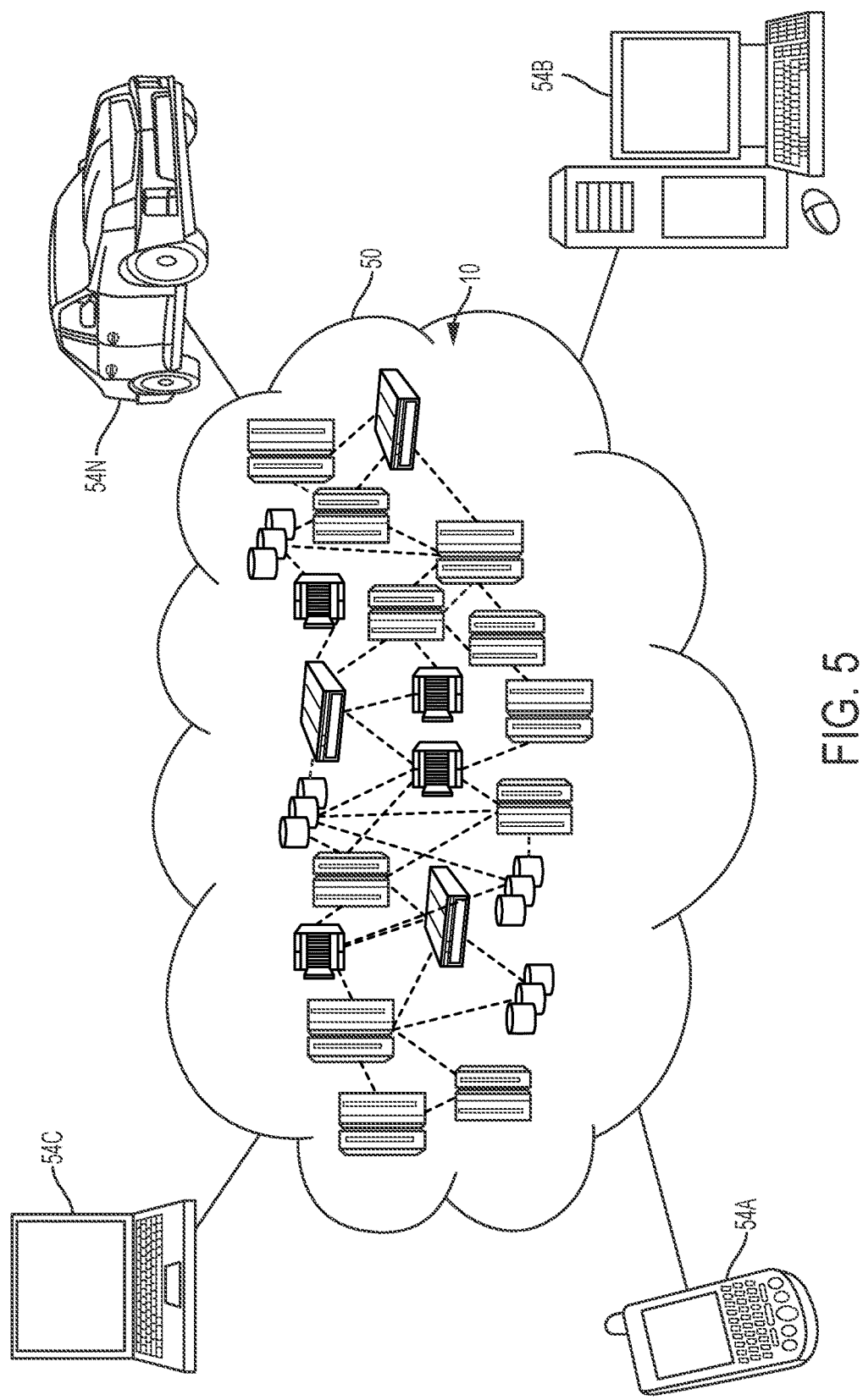
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
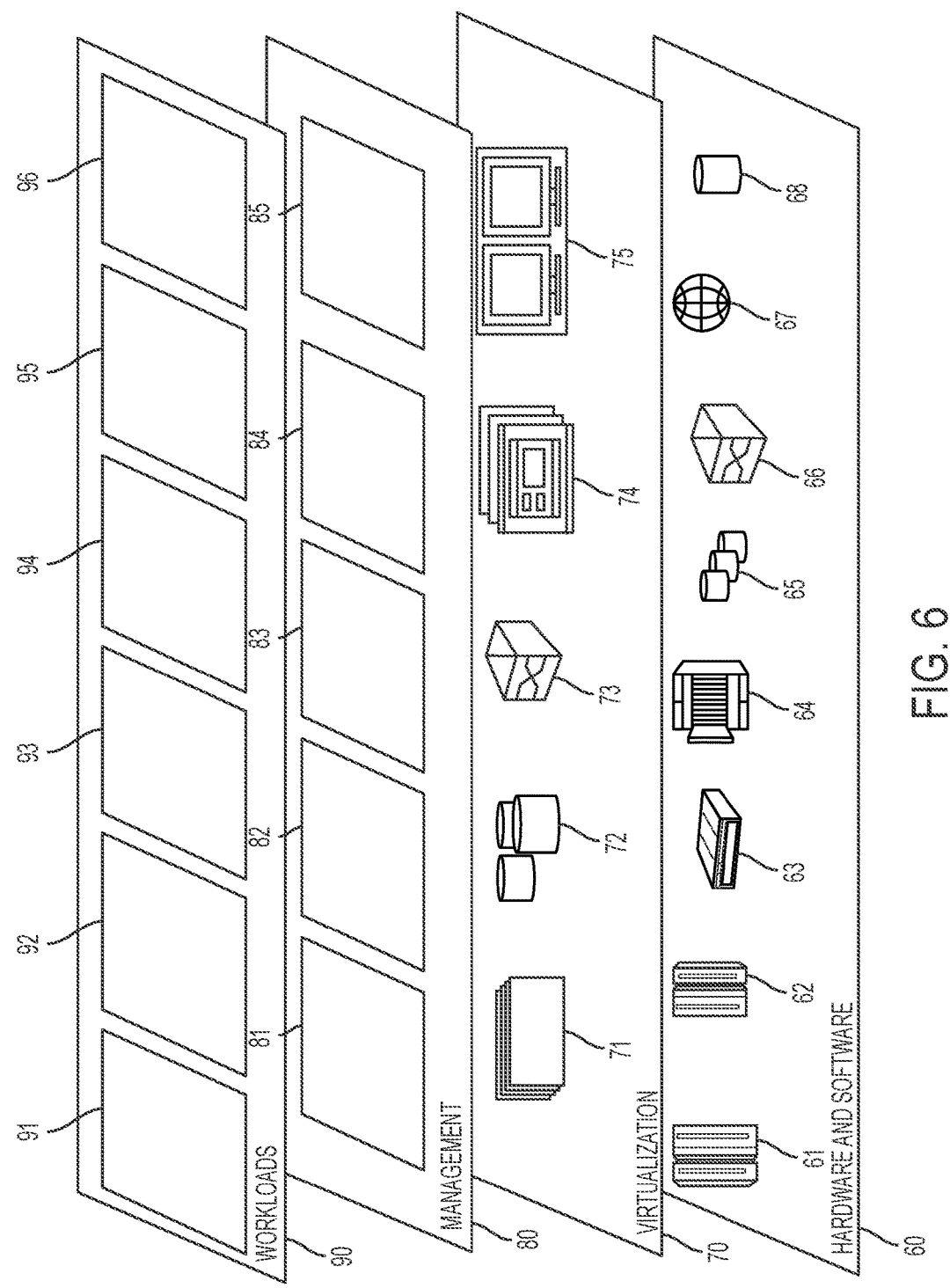
FIG. 6 illustrates a set of functional abstraction layers provided by cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving finger impression authentication technology associated with enabling user based actions with respect to accessing hardware or software 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An authentication improvement method comprising:
continuously receiving in real time, by a processor of a hardware device from a plurality of video retrieval devices, visual data associated with a surface of a structure associated with receiving authentication attributes for user access to hardware or software;
continuously tracking in real time, by said processor via said visual data, user interactions with said surface of said structure;
determining, by said processor, that a first user interaction of said user interactions comprises an authentication interaction for authorizing said user to access said hardware or software;
comparing, by said processor in response to results of said determining, said first user interaction with said surface of said structure with a previous user authentication interaction with said surface of said structure, wherein said results of said comparing indicate that multiple previous user authentication interactions with said surface of said structure are located on said surface of said structure, and wherein said action comprises alerting said user to clean said surface of said structure; and
executing, by said processor based on results of said comparing, an action associated with said access to said hardware or software.

2. The method of claim 1, wherein said previous user authentication interaction with said surface of said structure comprises visual data associated with said previously retrieved user authentication interaction stored in a database.

3. The method of claim 1, wherein said previous user authentication interaction with said surface of said structure comprises an additional visual image retrieved from said surface of said structure, and wherein said additional visual image is associated a previous user authentication interaction executed with respect to said surface of said structure.

4. The method of claim 1, wherein said structure does not comprise a display structure or an electronic structure.

5. The method of claim 1, wherein said user interactions with said surface of said structure comprise finger impression authentication actions with respect to said surface of said structure.

6. The method of claim 1, wherein said results of said comparing indicate that said user is not authorized to access said hardware or software, and wherein said action comprises blocking said access said hardware or software.

7. The method of claim 1, wherein said results of said comparing indicate that said user is authorized to access said hardware or software, and wherein said action comprises authorizing said access said hardware or software.

8. The method of claim 7, wherein said authorizing said access said hardware or software comprises:
determining a specified level of access to said hardware or software; and
enabling said user to access said hardware or software with respect to permissions associated with said specified level of access.

9. The method of claim 1, wherein said action further comprises alerting said user to perform an additional user authentication interaction with respect to an alternative portion of said surface of said structure, and wherein said additional user authentication interaction is associated with authorizing said user to access said hardware or software.

10. The method of claim 1, wherein said plurality of video retrieval devices comprise infrared cameras.

11. The method of claim 1, further comprising:
providing at least one support service for at least one of creating, integrating, hosting, maintaining, and deploying computer-readable code in the control hardware, said code being executed by the computer processor to implement: said continuously receiving in real time, said continuously tracking in real time, said determining, said comparing, and said executing.

12. A computer program product, comprising a computer readable hardware storage device storing a computer readable program code, said computer readable program code comprising an algorithm that when executed by a processor of a hardware device implements an authentication improvement method, said method comprising:
continuously receiving in real time, by said processor from a plurality of video retrieval devices, visual data associated with a surface of a structure associated with receiving authentication attributes for user access to hardware or software;
continuously tracking in real time, by said processor via said visual data, user interactions with said surface of said structure;

determining, by said processor, that a first user interaction of said user interactions comprises an authentication interaction for authorizing said user to access said hardware or software;

comparing, by said processor in response to results of said determining, said first user interaction with said surface of said structure with a previous user authentication interaction with said surface of said structure, wherein said results of said comparing indicate that multiple previous user authentication interactions with said surface of said structure are located on said surface of said structure, and wherein said action comprises alerting said user to clean said surface of said structure; and executing, by said processor based on results of said comparing, an action associated with said access to said hardware or software.

13. The computer program product of claim 12, wherein said previous user authentication interaction with said surface of said structure comprises visual data associated with said previously retrieved user authentication interaction stored in a database.

14. The computer program product of claim 12, wherein said previous user authentication interaction with said surface of said structure comprises an additional visual image retrieved from said surface of said structure, and wherein said additional visual image is associated a previous user authentication interaction executed with respect to said surface of said structure.

15. The computer program product of claim 12, wherein said structure does not comprise a display structure or an electronic structure.

16. The computer program product of claim 12, wherein said user interactions with said surface of said structure comprise finger impression authentication actions with respect to said surface of said structure.

17. The computer program product of claim 12, wherein said results of said comparing indicate that said user is not authorized to access said hardware or software, and wherein said action comprises blocking said access said hardware or software.

18. The computer program product of claim 12, wherein said results of said comparing indicate that said user is authorized to access said hardware or software, and wherein said action comprises authorizing said access said hardware or software.

19. A hardware device comprising a processor coupled to a computer-readable memory unit, said memory unit comprising instructions that when executed by the computer processor implements an authentication improvement method comprising:

continuously receiving in real time, by said processor from a plurality of video retrieval devices, visual data associated with a surface of a structure associated with receiving authentication attributes for user access to hardware or software;

continuously tracking in real time, by said processor via said visual data, user interactions with said surface of said structure;

determining, by said processor, that a first user interaction of said user interactions comprises an authentication interaction for authorizing said user to access said hardware or software;

comparing, by said processor in response to results of said determining, said first user interaction with said surface of said structure with a previous user authentication interaction with said surface of said structure, wherein said results of said comparing indicate that multiple previous user authentication interactions with said surface of said structure are located on said surface of said structure, and wherein said action comprises alerting said user to clean said surface of said structure; and executing, by said processor based on results of said comparing, an action associated with said access to said hardware or software.

* * * * *